US012264045B2

(12) United States Patent
Churchill et al.

(10) Patent No.: US 12,264,045 B2
(45) Date of Patent: Apr. 1, 2025

(54) CONSTRUCTION SYSTEM

(71) Applicant: Bechtel Energy Technologies & Solutions, Inc., Houston, TX (US)

(72) Inventors: Robert Churchill, Houston, TX (US); John Manuel, Houston, TX (US); Ivan Ku, Sugar Land, TX (US); Justin Monson, Orlando, FL (US)

(73) Assignee: Bechtel Energy Technologies & Solutions, Inc., Houston, TX (US)

( * ) Notice: Subject to any disclaimer, the term of this patent is extended or adjusted under 35 U.S.C. 154(b) by 0 days.

(21) Appl. No.: 18/636,816

(22) Filed: Apr. 16, 2024

(65) Prior Publication Data

US 2024/0262657 A1 Aug. 8, 2024

Related U.S. Application Data

(63) Continuation of application No. 17/838,460, filed on Jun. 13, 2022, now Pat. No. 12,012,311, which is a continuation of application No. 17/600,270, filed as application No. PCT/US2020/026142 on Apr. 1, 2020, now Pat. No. 11,390,497.

(60) Provisional application No. 62/828,022, filed on Apr. 2, 2019.

(51) Int. Cl.
*B66C 17/00* (2006.01)
*E04B 1/24* (2006.01)
*E04G 3/24* (2006.01)

(52) U.S. Cl.
CPC ............ *B66C 17/00* (2013.01); *E04B 1/2403* (2013.01); *E04B 2001/2415* (2013.01); *E04B 2001/2451* (2013.01); *E04G 3/24* (2013.01)

(58) Field of Classification Search
CPC ......... B66C 17/00; B66C 21/00; B66C 21/02; B66C 21/04; E04B 1/2403; E04B 2001/2415; E04B 2001/2451; E04B 3/24; Y10T 403/4605; Y10T 403/4608; Y10T 403/4611; Y10T 403/4614; Y10T 403/4621; Y10T 403/4691
USPC ..... 52/236.3, 636, 648.1, 650.1, 653.1, 637, 52/664, 758; 403/406, 342, 347
See application file for complete search history.

(56) References Cited

U.S. PATENT DOCUMENTS

| | | | | | |
|---|---|---|---|---|---|
| 1,712,650 | A * | 5/1929 | Clark | F21V 21/34 | 340/471 |
| 2,812,251 | A * | 11/1957 | Miller | D03J 1/002 | 15/312.1 |
| 2,845,877 | A * | 8/1958 | Richter | B66C 7/00 | 105/156 |
| 2,978,992 | A * | 4/1961 | Wason | B66C 7/00 | 105/154 |

(Continued)

*Primary Examiner* — Brian E Glessner
*Assistant Examiner* — Adam G Barlow
(74) *Attorney, Agent, or Firm* — William P. Jensen; Crain Caton & James

(57) ABSTRACT

A system and method for construction of a framed structure which permits on-site storage and relocation of construction materials using trolleys and cranes supported by the framed structure. The system provides a runway surface for removable attachment of trolleys, crane bridges, and platforms by offsetting the first longitudinal beam and a second longitudinal beam from a cross beam and where the first longitudinal beam, second longitudinal beam, and cross beam of the system provide components for the framed structure.

3 Claims, 7 Drawing Sheets

(56) References Cited

U.S. PATENT DOCUMENTS

| | | | | | |
|---|---|---|---|---|---|
| 3,593,477 | A * | 7/1971 | Briggs | E04B 1/185 | 52/283 |
| 4,004,156 | A * | 1/1977 | Schuller | B66C 13/22 | 318/293 |
| 4,014,089 | A * | 3/1977 | Sato | E04B 1/2403 | 228/140 |
| 4,318,346 | A * | 3/1982 | Sessum | B66C 9/14 | 105/163.1 |
| 4,367,972 | A * | 1/1983 | Panthout | F16B 7/0493 | 403/387 |
| 5,138,953 | A * | 8/1992 | Horcher | A61G 7/1015 | 212/331 |
| 7,143,550 | B1 * | 12/2006 | Lopez | E04B 1/3205 | 52/81.3 |
| 7,310,920 | B2 * | 12/2007 | Hovey, Jr. | E04B 1/24 | 52/656.1 |
| 7,762,038 | B2 * | 7/2010 | Ceba | E04B 1/2403 | 52/655.1 |
| 7,850,026 | B2 * | 12/2010 | McKay | B66C 17/00 | 104/111 |
| 8,640,420 | B1 * | 2/2014 | Halley | E04F 10/08 | 52/650.1 |
| 8,960,459 | B2 * | 2/2015 | Givens | B66C 5/10 | 212/73 |
| 10,415,230 | B1 * | 9/2019 | Abbas | E04B 1/98 | |
| 10,913,638 | B2 * | 2/2021 | Yin | B66C 7/04 | |
| 10,961,696 | B2 * | 3/2021 | Mou | E04H 9/0237 | |
| 11,098,476 | B2 * | 8/2021 | Jin | E04B 1/2403 | |
| 11,236,502 | B2 * | 2/2022 | Houghton | E04B 1/1903 | |
| 11,261,848 | B2 * | 3/2022 | Eliason | B23F 21/12 | |
| 11,299,880 | B2 * | 4/2022 | Pryor | E04B 1/24 | |
| 2004/0074161 | A1 * | 4/2004 | Kasai | E04H 9/0237 | 52/167.3 |
| 2006/0144006 | A1 * | 7/2006 | Suzuki | E04H 9/024 | 52/655.1 |
| 2008/0110844 | A1 * | 5/2008 | Lewis | B66C 13/48 | 212/270 |
| 2008/0302033 | A1 * | 12/2008 | Insalaco | B66C 7/04 | 52/220.2 |
| 2011/0180507 | A1 * | 7/2011 | Givens | B66C 5/02 | 212/312 |

* cited by examiner

CONSTRUCTION SYSTEM

CROSS-REFERENCE TO RELATED APPLICATIONS

This application is a continuation of U.S. application Ser. No. 17/838,460, filed Jun. 13, 2022, which is a continuation of U.S. Pat. No. 11,390,497, issued Jul. 19, 2022, which is a U.S. National Stage Application of PCT Patent Application Serial No. PCT/US20/26142, filed Apr. 1, 2020, which claims priority to U.S. Provisional Application No. 62/828,022, filed Apr. 2, 2019, each of which are incorporated herein by reference.

FIELD OF THE DISCLOSURE

The following disclosure generally relates to a system for construction of a framed structure. More particularly, a system is provided which permits on-site storage and relocation of construction materials using trolleys and cranes supported by the framed structure.

BACKGROUND

Construction of framed structures and the locating of the equipment therein presents difficulties. One such example the installation of commodities in facilities where components are supported by a framed structure, normally of structural steel. In general, these facilities are related to some sort of process to create a product or products through some variation of chemical, or thermodynamic reactions. Piping is a substantial component of these systems which often require storage of the pipes. These facilities typically have long lengths of these structures at multiple elevations, the general term for these structures is pipe racks, but there is a possibility that these structures could support other commodities required for the facility and may not have any piping at all. Piping installation dates back to the discovery of natural resources, primarily oil, in the late 19th century. Pipelines were installed to transport the commodity from the location where it was extracted to facilities designed to refine the resource from its natural state to useable, fuels and other byproducts. These facilities require a large amount of heat and pressure to segregate the fuels, which are then transported to tanks to await further transport to their final location for consumption. As the facilities began to get more complex, more processes were developed to utilize the byproducts for items other than solely fuel and the facilities expanded considerably. The construction of these facilities, not just around hydrocarbons, but an endless list of chemicals, ores, etc., has been a large undertaking for any operator as the capital expense for the commodities required to build the facility are expensive and require a considerable amount of resources to design, procure and construct.

The basic concept of a pipe rack design has not changed significantly in many decades. The basic premise is that the structure is comprised of several bents with varying cross members to hold commodities, more specifically piping and electrical commodities to be able to transfer current or process liquid, or gas through a facility to another section of the facility or to a new facility. The standard composition of columns and cross beams is subsequently enhanced with additional support steel to improve performance and to limit movement during different load cases. The bents are then stabilized with beams that connect the bents to limit lateral movement. Traditionally, these are very basic structures that do not provide any type of assistance for the installation of downstream commodities after the steel is erected. It is up to the contractor to be able to figure out how to install the piping, electrical or other commodities based on the configuration of the steel and the piping.

During the construction phase of a facility or a facility expansion, positioning of equipment, and particularly piping, may be a substantial portion of the scope of work and consume much of the time and cost for fabrication. Transportation, storage, and preparation may also require time and space.

There has been limited innovation or advances in the way that these facilities are designed and constructed. The facilities today, look very similar to the facilities of old during construction, as the same equipment, materials, and work practices or processes are used to construct these facilities. Historically, in order to erect a fabricated section of piping, which typically weigh several tons, a large crane with a long boom is needed, first to allow the piping to reach its destination from a point usually a significant distance from the final location, and second, that is designed to lift such a heavy load. The sheer size of these cranes limited its capability to nimbly move in and around these structures and normally required the piping to be placed some distance from its final location and moved manually to its final position through any combination of lifting devices, normally chain hoists and come-a-longs. As can be appreciated, these various movement systems increased risk as the combination of lifting configurations would be infinite and the nature with which these large, heavy components, which must be secured prior to lift, could cause a sudden shift as if it was suspended by these devices in an unsafe manner.

In order to ease the complexity of these types of piping installations, there have been instances were beams were installed to allow for a trolley to be run from one end of a structure to a location to remove the risk, and improve productivity. These beams are rarely utilized because they require additional cost to the project, and must be removed and disposed of after completion of the construction phase. As steel is a costly commodity, the cost of purchasing these beams can be considerable.

Even after equipment, including piping, is positioned within framed structure at or in its final position, there remains a significant amount of work that has to be completed to finalize the construction of the piping. Personnel must access the piping to prepare it for a weld, the welding or connecting activity itself, and then commonly some sort of insulation, paint, instrumentation, etc., may be installed with the piping to meet the design for the facility.

This work is not facilitated by the framed structure. Instead scaffolding is used to reduce the risk of falling from height and to allow a level and safe working surface for personnel. In many of these structures, there is such a significant amount of work that a single platform is erected under the piping elevations to allow movement from one activity to another without having to climb up and down to get to the next work location, in addition, if there is an activity, such as insulating a pipe, that covers the entire length of a pipe line, then it is difficult to avoid a blanket scaffold platform during peak construction.

Complicating matters, the work requires electrical power for tools. Power tools are commonly used to prepare, grind, cut or perform other tasks needed to connect the piping. As there is no need for permanent power in these locations, when the facility is in operation, limited power is provided during construction. Many times workers are required to drop extension cords, or welding leads (if welding is being performed), to the ground from their elevated work location and stretch the cord to a temporary power bank location, sometimes several hundred feet from the actual work location, or to a generator, if no power bank is provided. This effort is very cumbersome and where an issue with the source of power arises, considerable effort may be required to locate and rectify the issue, resulting in loss productivity. The electrical cords themselves are often damaged and have to be replaced as they are being placed and moved continuously.

Positioning, preparation, fabrication and tool connections are further complicated by the framed structure as diagonal cross braces may be internally provided across the framed structure, limiting accessibility of portions of the framed structure.

BRIEF DESCRIPTION OF THE DRAWINGS

The detailed description is described with reference to the accompanying drawings, in which like elements are referenced with like reference numbers, and in which.

DETAILED DESCRIPTION OF THE ILLUSTRATIVE EMBODIMENTS

Figure 1:
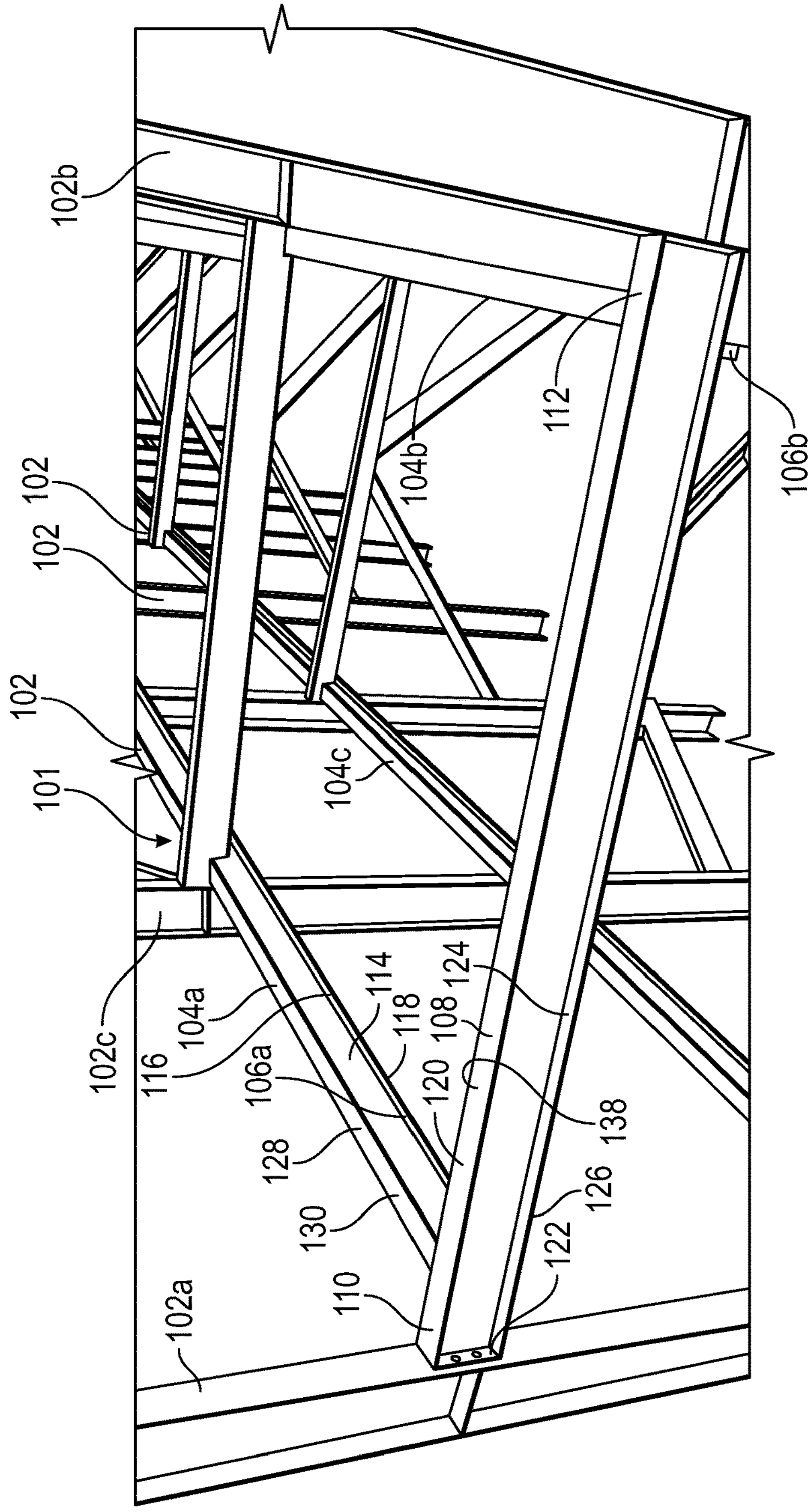
FIG. 1 is an isometric view illustrating the system of the present disclosure.

The subject matter disclosed herein is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Although the term "step" may be used herein to describe different elements of methods employed, the term should not be interpreted as implying any particular order among or between various steps herein disclosed unless otherwise expressly limited by the description to a particular order. Other features and advantages of the disclosed embodiments will thus, be or become apparent to one of ordinary skill in the art upon examination of the following figures and detailed description. It is intended that all such features and advantages be included within the scope of the disclosed embodiments. Further, the illustrated figures are only exemplary and are not intended to assert or imply any limitation with regard to the environment, architecture, design, or process in which different embodiments may be implemented.

The apparatus and methods disclosed herein overcome one or more of the prior art disadvantages of prior construction by providing a structure where the longitudinal member also provides a track for rolling members including a removable trolley, a removable bridge crane, or a removable platform. The apparatus and methods disclosed improve piping installation methodology to reduce the amount of time that is allocated for piping erection while decreasing the footprint needed onsite for installation equipment and improving safety by reducing the at risk time that is inherent to piping installation activities.

The present disclosure provides a system for use in a framed structure where an internal framework is constructed which facilitates on-site positioning and storage of equipment without the need for temporary external cranes, scaffolding, and work surfaces. The present disclosure provides the addition of a single runway beam, or multiple runway beam and all connection details associated with those runway beams to provide lateral support between bents and to facilitate easier installation of downstream commodities, such as piping, electrical and other components using the runway beams to support a trolley, bridge crane or other mechanical or system, including propelled and manual systems.

In one embodiment, a structural system is disclosed, comprising: i) a first longitudinal beam and a second longitudinal beam wherein a planar space between the first longitudinal beam and the second longitudinal beam is free of any obstructions, the first longitudinal beam having a first longitudinal beam lower rectangular flange, the second longitudinal beam having a second longitudinal beam lower rectangular flange; ii) a cross beam affixed at a cross beam first end to a first support beam and at a cross beam second end to a second support beam, the cross beam positioned above the first longitudinal beam lower rectangular flange and the second longitudinal beam lower rectangular flange, the first longitudinal beam lower rectangular flange and the second longitudinal beam lower rectangular flange adapted to provide a track for engagement by a removable repositioning device; and iii) a removable bus bar positioned adjacent a longitudinal beam vertical web intermediate the cross beam and a first longitudinal beam lower rectangular flange top surface.

In another embodiment, a method is disclosed for construction of a structural system, comprising: i) providing a plurality of support beams; ii) attaching a first longitudinal beam having a first longitudinal beam lower rectangular flange horizontally to two of the plurality of support beams; iii) attaching a second longitudinal beam having a second longitudinal beam lower rectangular flange horizontally to a further two of the plurality of support beams, the first longitudinal beam parallel and vertically aligned with the second longitudinal beam, wherein a planar space between the first longitudinal beam and the second longitudinal beam is free of any obstructions; iv) attaching a cross beam at a cross beam first end to a first support beam of the plurality of support beams above the longitudinal beam lower rectangular flange of the first longitudinal beam, the first longitudinal beam lower rectangular flange adapted to provide a track for engagement by a removable repositioning device; v) attaching the cross beam at a cross beam second end to a second support beam of the plurality of support beams above the second longitudinal beam lower rectangular flange of the second longitudinal beam, the second longitudinal beam lower rectangular flange adapted to provide a track for engagement by a removable repositioning device; and vi) coupling a cross beam first end flange at the cross beam first end to the first support beam and the first longitudinal beam with a connector, the connector comprising: i) a first L-shaped bracket adapted to contact the cross beam first end flange and a top surface of a first longitudinal beam top rectangular flange; and ii) a second L-shaped bracket adapted to contact the first support beam and the cross beam lower flange at the cross beam lower edge.

Figure 2:
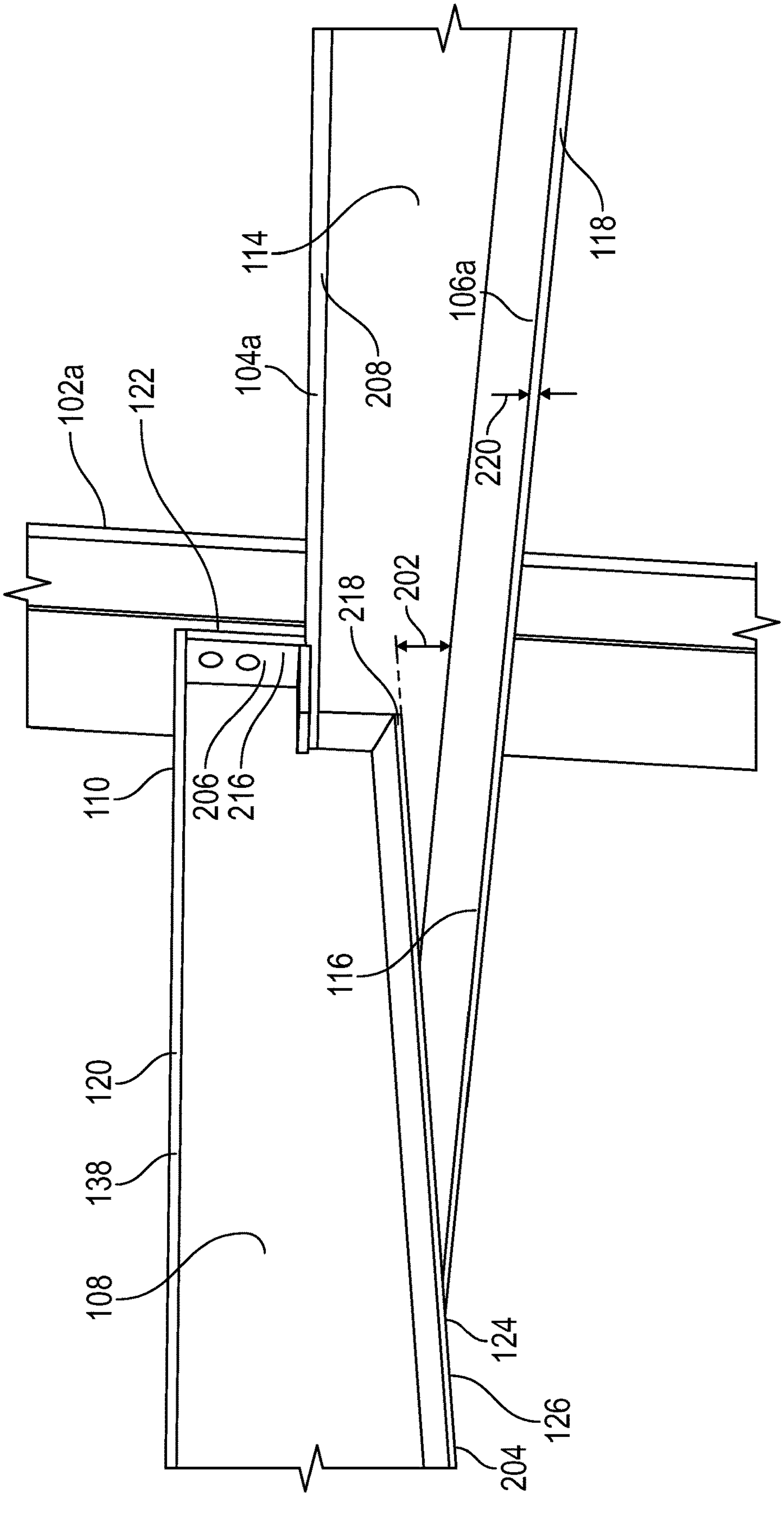
FIG. 2 is an isometric view illustrating the connection of a support beam, a longitudinal beam, and a cross beam of the system of the present disclosure.

Referring to FIGS. 1 and 2, an isometric view of the system of the present disclosure and a view of the connection of a support beam, a longitudinal beam, and a cross beam of the system of the present disclosure are illustrated. The structural system 100 a framed structure 101 with multiple support beams 102 for construction and maintenance of a facility. The structural system 100 includes a first longitudinal beam 104*a* and a second longitudinal beam 104*b*, and a cross beam 108. The first longitudinal beam 104*a* has a first longitudinal beam lower flange 106*a* and the second longitudinal beam 104*b* has a second longitudinal beam lower rectangular flange 106*b* and are each positioned so no support beam is located between the first longitudinal beam 104*a* and the second longitudinal beam 104*b*. The planar space between the first longitudinal beam 104*a* and the second longitudinal beam 104*b* is free of any obstructions.

The cross beam 108 is affixed at a cross beam first end 110 to a first support beam 102*a* and at the cross beam second end 112 to a second support beam 102*b* and is positioned above the first longitudinal beam lower rectangular flange 106*a* and is positioned above the second longitudinal beam lower rectangular flange 106*b*. When desired, the cross beam 108 may penetrate through the first longitudinal beam 104*a* and penetrate through the second longitudinal beam 104*b*. When desired, the cross beam 108 may be spaced above the first longitudinal beam lower rectangular flange 106*a* and the second longitudinal beam lower rectangular flange 106*b* by a longitudinal beam lower rectangular flange spacing 202.

Referring to FIGS. 1, 4, 5, and 6, each of the first longitudinal beam lower rectangular flange 106*a* and the second longitudinal beam lower rectangular flange 106*b* is adapted to provide a track for engagement by a removable repositioning device 400 having a first plurality 504 of upper wheels 502 adapted to contact the first longitudinal beam lower rectangular flange 106*a* and having a second plurality 508 of upper wheels 502 adapted to contact the first longitudinal beam lower rectangular flange 106*a*. Each of the two longitudinal beams 104, 104*a*, 104*b* may have a longitudinal beam vertical web 114 attached to the longitudinal beam lower rectangular flange 106 at a longitudinal beam lower rectangular flange top surface 116, each of the two longitudinal beams 104, 104*a*, 104*b* having a longitudinal beam lower rectangular flange first edge 118 extending away from the longitudinal beam vertical web 114. These removable repositioning devices 400 may be equipped with the necessary safety technology to prevent obstructions, striking personnel, sway, and other hazards associated with the use of cranes in close confinement with personnel. These removable repositioning devices 400 are removed upon completion.

Figure 3:
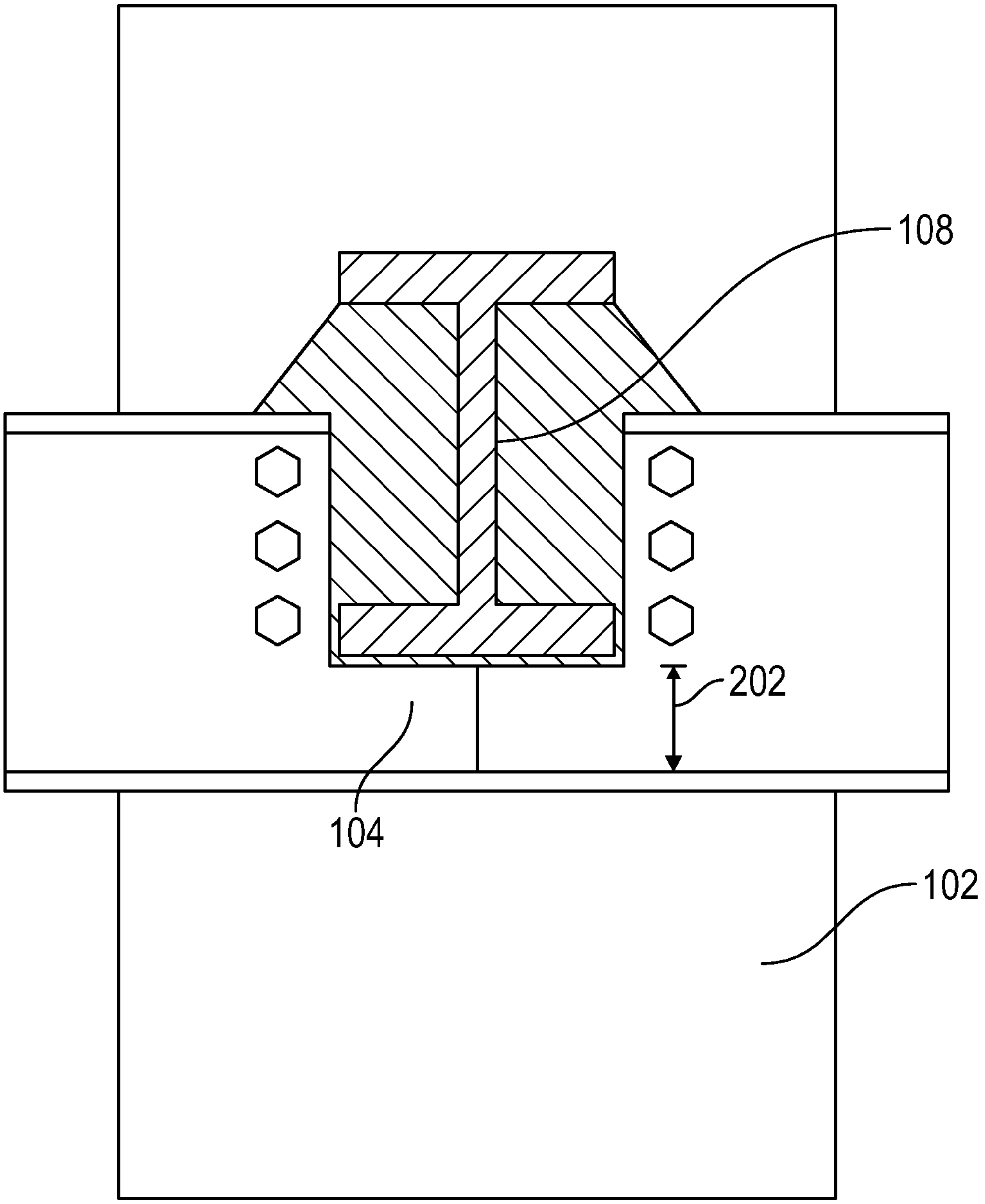
FIG. 3 is an end view illustrating the connection of a support beam, a longitudinal beam, and a cross beam of the system of the present disclosure.

Referring now to FIG. 2 and to FIG. 3, an end view of the connection of a support beam, a longitudinal beam, and a cross beam of the system of the present disclosure is illustrated. Likewise, the cross beam 108 may be affixed at the cross beam first end 110 to the first longitudinal beam 104*a*, where the cross beam lower edge 204 is spaced above the longitudinal beam lower rectangular flange 106 of the first longitudinal beam 104*a* by the longitudinal beam lower rectangular flange spacing 202. The cross beam 108 may therefore penetrate through the second longitudinal beam 104*b* and be affixed at the cross beam second end 112 to the second longitudinal beam 104*b*, and may be spaced above the longitudinal beam lower rectangular flange 106 of the second longitudinal beam 104*b*.

This positions the longitudinal beam lower rectangular flange 106 for use as runway members, which run the length of the pipe rack, or framed structure 101 so any removable repositioning devices 400 can transit the entire length of the framed structure 1010. Since these runway members are used only during the construction phase of the framed structure 101, including steel for this singular purpose is an unnecessary consumption of time, labor and materials. Here, this waste is avoided as the runways are provided on the longitudinal beam lower rectangular flange 106*a*, 106*b* of each of the longitudinal beams 104*a*, 104*b*, which simultaneously define and support the framed structure 101. Since these first and second longitudinal beams 104*a*, 104*b* are offset from the support beams 102, cross beam 108 serve as bracing members to transfer the load to the support beams 102. When desired, the longitudinal beams 104 may be only partially offset down from the top of the cross beams 108 to allow for increased utilization of the first and second longitudinal beams 104*a*, 104*b*, as a deeper crane beam in the removable repositioning device 400 can be chosen without sacrificing excessive head clearance between pipe rack elevations.

A connector 206 may be used to facilitation the offset structure of the first and second longitudinal beam 104*a*, 104*b* and the cross beam 108. The connector 206 may include a first L-shaped bracket 216 and a second L-shaped bracket 218. The first L-shaped bracket 216 may contact the cross beam first end flange 122 and a longitudinal beam top rectangular flange top surface 128 of a longitudinal beam top rectangular flange 130 attached to the longitudinal beam vertical web 114 at a longitudinal beam top rectangular flange bottom surface 208. The second L-shaped bracket 218 is adapted to contact the first support beam 102*a* and the cross beam lower flange 124 at the cross beam lower edge 126. Thus, the connector may adapted to couple a cross beam first end flange 122 at a cross beam first end 110 to a first support beam 102*a* and to couple to the first longitudinal beam 104*b* with the cross beam first end flange 208 extends from a cross beam lower flange 124 at the cross beam lower edge 126 to a cross beam upper flange 120 at a cross beam upper edge 138.

Figure 4:
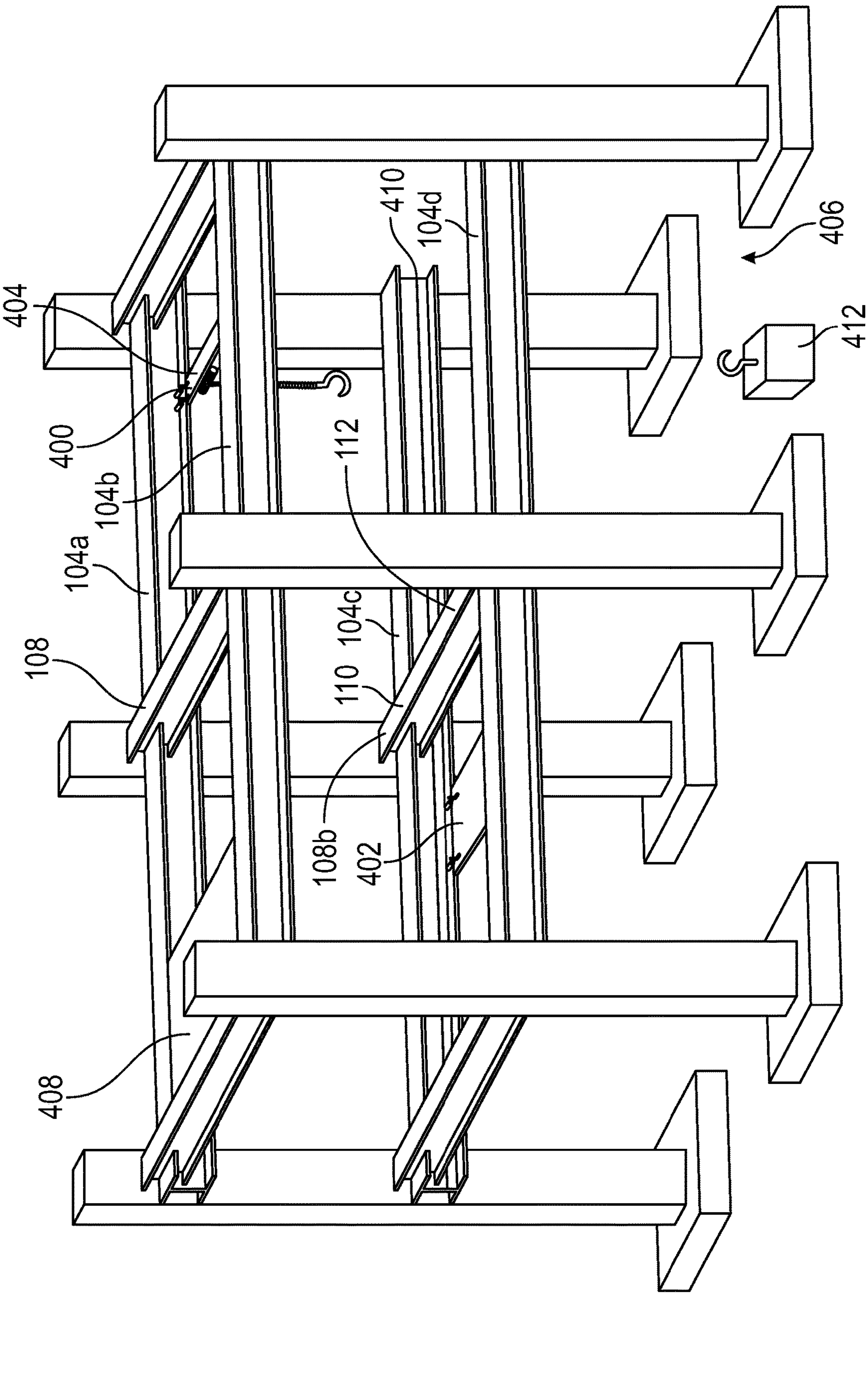
FIG. 4 is an isometric view illustrating the system of the present disclosure with a removable trolley, removable bridge crane and removable work platform and showing a loading bay.

Referring to FIG. 4, an isometric view of the system of the present disclosure with a removable trolley, removable bridge crane, an on-board electrical bus, and removable work platform and showing a loading bay is illustrated. When desired, the structural system 100 may provide benefits to enable repositioning of equipment and personnel, i.e., system components 412. A removable repositioning device 400 may be selected from the group consisting of a trolley 402 or a bridge crane 404 to be coupled to the longitudinal beam lower rectangular flange 106. The structural system 100 may include a second removable repositioning device 400 selected from the group consisting of a trolley 402 and a bridge crane 404, where the second removable repositioning device 400 not being the same as the removable positioning device 400. A removable bus bar 410 may be positioned adjacent the longitudinal beam vertical web 114 intermediate the cross beam 108 and the longitudinal beam lower rectangular flange top surface 116. Finally, the loading bay 406 may be included in the structure laterally adjacent and below the cross beam 108. Such a loading bay 406 may be provided at the base of a frame structure 101. A loading bay 406 may be used only as a pipe rack. This loading bay 406 may be a part of the final structure or an additional bay installed solely for the installation of the system components 412. Notably the loading bay 406 has no cross braces 108 or lateral braces and so ensures the un-obstructed rigging and lifting of commodities to their design elevation. If part of the permanent frame structure 101, the lateral bracing and cross beams 108 would be installed upon completion of the erection of the commodities within that section of the pipe rack.

The structural system 100 provides for transportation and installation of system components 412 utilizing at least one continuous rail system to deliver materials and commodities to their design location using trollies, manual or otherwise, and/or bridge cranes. To avoid the additional costs associated with the installation of a retrofitted mono or dual rail system with regards to the purchase of additional steel, the installation and removal of the beams and the complexity of those activities with regards to lifting and safely installing and removing, the longitudinal beams provide the runway for rolling devices and the cross beams are positioned above the longitudinal beam lower rectangular flange 106 at a longitudinal beam lower rectangular flange spacing 202 and any rolling equipment is sized to have a height less than the longitudinal beam lower rectangular flange spacing 202. The structural system 100 thus provides a structure which combines the role of the longitudinal struts in a pipe rack with the runways of bridge crane rail to maximize efficiency in the utilization of steel members in both the construction and operating conditions of the framed structure 101 as well as to assist in the loading of pipe into the framed structure 101.

In order to expand the role of the first and second longitudinal beams 104*a*, 104*b*, the connector 206 may be positioned so the longitudinal beam lower rectangular flange 106 is sufficiently distant the cross member 108 to allow for an un-obstructed path for these mechanisms to travel the complete length of the first and second longitudinal beams 104*a*, 104*b*. Thus, steel longitudinal beams 104*a*, 104*b* serve as both structure to address loading conditions and as a construction aid that is not removed or discarded after the installation of the system components 412. Thus, once the first and second longitudinal beams 104*a*, 104*b* have been installed, a clear path is formed to allow for the un-obstructed installation of the system components 412, including pipe. These first and second longitudinal beams 104*a*, 104*b*, however will not be utilized solely for the installation of the system components 412 such as equipment and piping, but also to support other activities in the framed structure 101, the rack, required to complete the full installation of the structure.

Once support and a clear pathway is established within the frame structure 101, the mechanisms for the installation can be installed to improve the time and reduce risk with the overall installation by utilizing smaller trolley 402 and bridge cranes 404 in the structures 101 to assume the loads reserved for larger cranes outside of the pipe rack structure.

Figure 5:
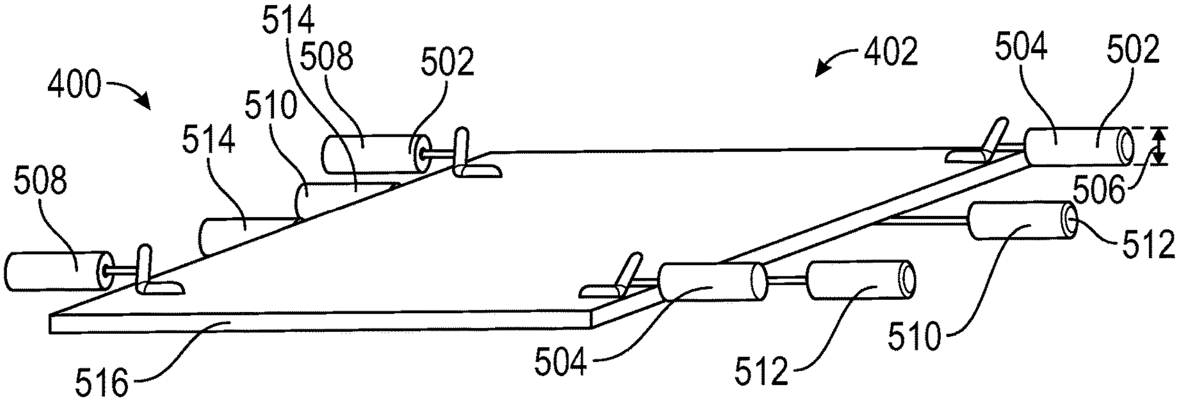
FIG. 5 is an isometric view illustrating the removable trolley of FIG. 4.

Referring to FIG. 5, an illustration of an isometric view of the removable trolley 402 of FIG. 4 is provided. The removable trolley 402 may include a trolley body 516 coupled to a first plurality 504 of upper wheels 502, and a second plurality 508 of upper wheels 502 and may have a first plurality 512 of lower wheels 510, and a second plurality 514 of lower wheels 510.

Figure 6:
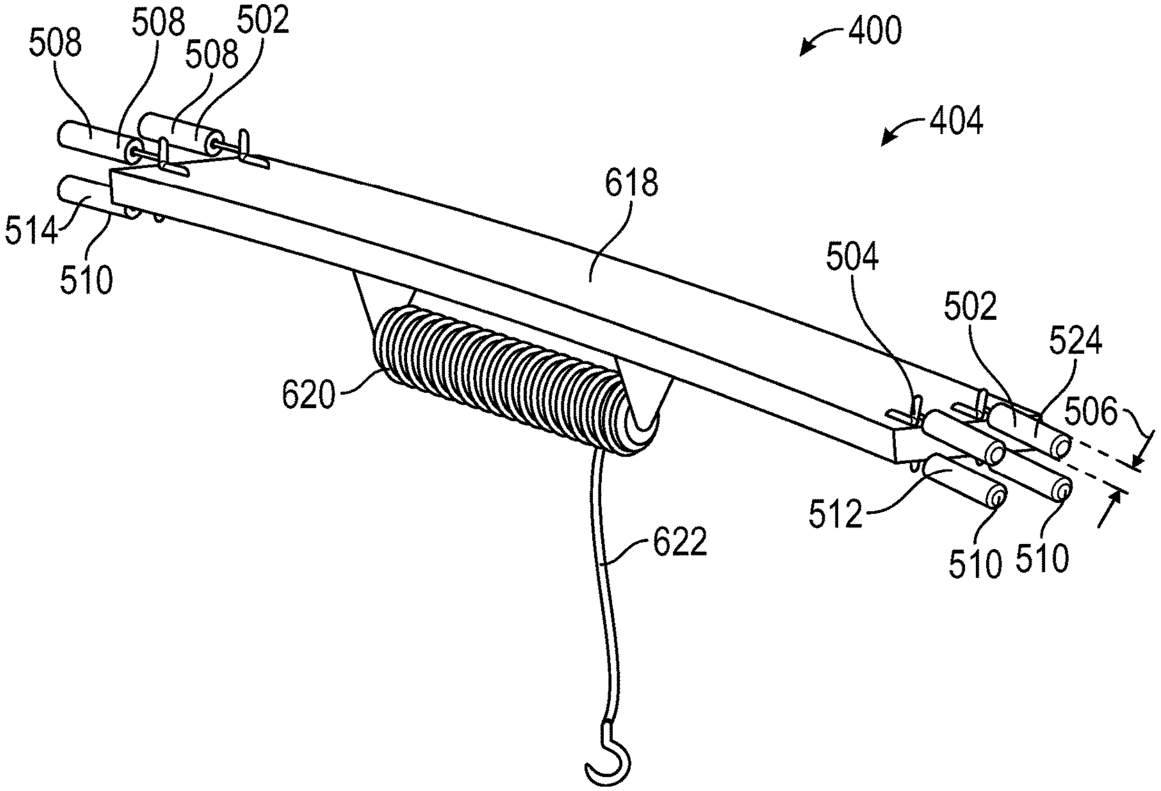
FIG. 6 is an isometric view illustrating the removable bridge crane of FIG. 4.

Referring to FIG. 6, an illustration of an isometric view of the removable bridge crane 404 of FIG. 4 is provided. The removable bridge crane 404 may include a bridge crane body 618 coupled to a first plurality 504 of upper wheels 502, and a second plurality 508 of upper wheels 502 and may have a first plurality 512 of lower wheels 510, and a second plurality 514 of lower wheels 510 and having a winching body 620 and a winching line 622.

The first plurality 504 of upper wheels 502 is spaced apart from the first plurality 512 of the lower wheels 510 by a longitudinal beam lower rectangular flange thickness 220. The first plurality 504 of upper wheels 502 is adapted to transit the longitudinal beam lower rectangular flange 106 of the first longitudinal beam 104*a* and the first plurality 512 of the lower wheels 510 is likewise adapted to contact the longitudinal beam lower rectangular flange 106. The second plurality 508 of upper wheels 502 is also spaced apart from the second plurality 514 of the lower wheels 510 by the longitudinal beam lower rectangular flange thickness 220. The second plurality 508 of upper wheels 502 is adapted to removably transit the longitudinal beam lower rectangular flange 106 of the second longitudinal beam 104*b* and the second plurality 514 of the lower wheels 510 is adapted to contact the longitudinal beam lower rectangular flange 106.

In operation, once materials are available at ground level, a bridge crane 406 would travel to the loading bay 406 via the longitudinal beam lower rectangular flange 106 and the winching line 622 attached to the material to be moved. The winching line 622 would then be retracted into or around the winching body 620 to lift the material, such as piping into place at the elevation required per the design. The bridge cranes 406 or trolleys 404 would then travel the length of the frame structure 101 to the temporary and/or ultimate location of the system component 412, which could be piping, wiring, or equipment.

Figure 7:
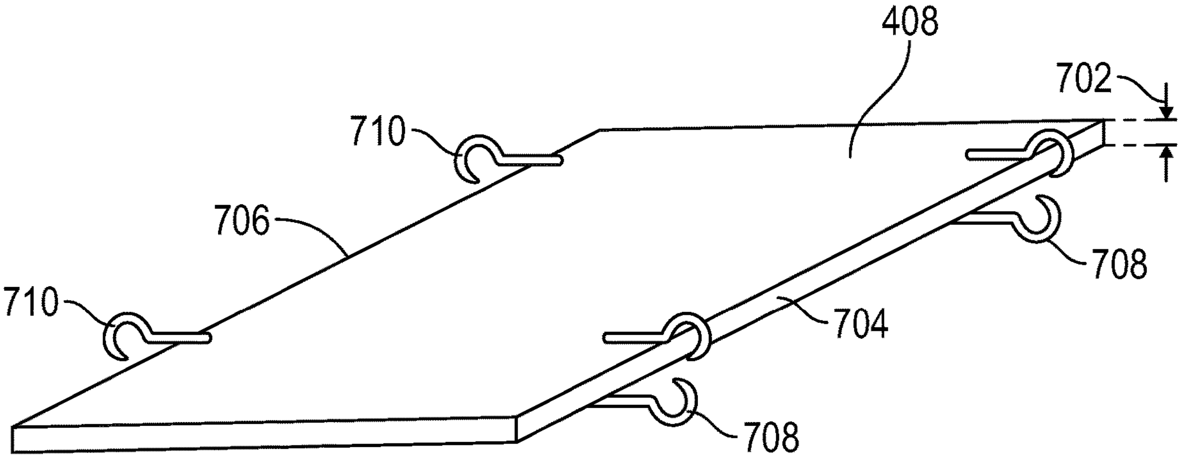
FIG. 7 is an isometric view illustrating the removable work platform of FIG. 4.

Referring to FIG. 7, an isometric view of the removable work platform of FIG. 4 is illustrated. The removable work platform 408 includes a number of coupling device and permits the coupling devices to disengage from the longitudinal beam lower rectangular flange 106 or to exit the longitudinal beam lower rectangular flange 106 so the removable work platform 408 remains removable from the frame structure 101. To the end, the removable work platform 408 has a work surface thickness 702 less than longitudinal beam lower rectangular flange spacing 202, and having a work surface first end 704 and a work surface second end 706, has a first work platform couple 708 adapted to removably couple the removable work platform 408 to the first longitudinal beam 104*a*; and has a second work platform couple 710 adapted to removably couple the removable work platform 408 to the second longitudinal beam 104*b*.

Support of personnel through the use of removable work platforms 408 supported by the longitudinal beam lower rectangular flanges 106, the runway beams, facilitates construction without delay. Both during the erection process described above and for activities that are performed after the erection of the commodity, such as welding, insulation, painting and other activities can be performed by personnel supported by removable work platforms 408 supported by the longitudinal beam lower rectangular flange 106.

The nature of the longitudinal beam lower rectangular flanges 106 allow for these removable work platforms 408 to be moveable within the frame structure 101 itself along the same path of the bridge cranes 406 that have been described above. The personnel will access the removable work platform 408 via temporary walkways, then perform the work as required, exit the removable work platform 408, and then the removable work platform 408 will be relocated along the longitudinal beam lower rectangular flanges 106 either by use of a mechanized system or manually to the next work location. More than one removable work platform 408 may be required within a distinct elevation to support multiple work activities progressing concurrently, and when one work activity is completed, the removable work platforms 408 can be re-used for other activities later in the project.

As these are temporary work platforms, they preferably will be equipped with the necessary safety precautions to prevent falls from heights, falling objects and other hazards associated with work at elevations. These removable work platforms 408 are for temporary construction use only and are removed upon completion of the construction activities.

Referring again to FIG. 4, as the bridge cranes 406, trolleys 404 and removable work platforms 408 may be mechanized, power may be obtained from electrical source, known as a buss bar 410 that provides continuous power down the length of the framed structure 101. As these devices require minimal power, these bus bars 410 can be designed and fabricated with 200 Amps of power to be utilized for construction activities. To utilize the installation of a bus bar 410 to its maximum capability, removable work platforms 408 may be equipped with a transformer to convert the bus bar power from 480V to 110V or 220V to support the needs for small power tools required to perform work activities at these locations, such tools include grinders, drills, and other equipment. The 480V power can also be utilized to power the welding machines at elevation which eliminates the need to place these welding machines at grade near temporary power port locations. The bus bar 410 thus eliminates draping extension cords and welding leads to ground locations and the power source automatically moves with the removable work platforms 408. The bus bars 410 may be equipped with the necessary safety precautions for personnel to work near the live source without danger of coming into contact with the electrical source and may be removed upon completion of the work activities for use at other work locations as required and are removed upon completion of the work in the framed structure 101. When desired, a combination of bridge crane 406, trolley 404 and removable work platform 408 may be provided between the first longitudinal beam 104*a* and the second longitudinal beam 104*b*, and one moved out of position and another into position as needed.

Referring again to FIG. 4, more than one level of the structural system 100 can be used in connection with the framed structure 101. To provide an additional level, the structural system 100 includes a third longitudinal beam 104*c*, a fourth longitudinal beam 104*d*, and a second cross beam 108*b*. Each of the third longitudinal beam 104*c* and the fourth longitudinal beam 104*d* have a longitudinal beam lower rectangular flange 106 and are positioned so no support beam is located between them. The second cross beam 108*b* is affixed at a second cross beam first end 110 to the first support beam 102*a* and at the second cross beam second end 112 to the second support beam 102*b*. The second cross beam 108*b* is positioned to penetrate through the third longitudinal beam 104*c* and spaced above the longitudinal beam lower rectangular flange 106 of the third longitudinal beam 104*c* by the longitudinal beam lower rectangular flange spacing 202. Likewise, the second cross beam 108*b* is positioned to penetrate through a fourth longitudinal beam 104*d* and is spaced above the longitudinal beam lower rectangular flange 106 of the fourth longitudinal beam 104*d* by the longitudinal beam lower rectangular flange spacing 202. A second removable repositioning device 400, selected such as a trolley 402 or a bridge crane 404 may be provided to engage the longitudinal beam lower rectangular flange 106 of the third longitudinal beam 104*c* and the longitudinal beam lower rectangular flange 106 of the fourth longitudinal beam 104*d*. When desired, the second removable repositioning device 400 may be the same as the removable positioning device 400 or may be a different removable repositioning device 400.

Thus, when the removable repositioning device 400 is a bridge crane 404, the system component 412 may be lifted to the appropriate elevation and moved laterally into place by conventional methods. With a second removable repositioning device 400 provided at different levels within the framed structure 101, then system component 412 may be lifted to the appropriate level by a bridge crane 404, then lowered onto a second trolley 402 to repositioning in the framed structure 101. In both situations, the elimination of conventional lifting methods provided improved productivity and safety. This process can be replicated multiple times over on multiple levels to maximize efficiency and reduce the amount of time required to position the system components 412 and erect piping the framed structure 101, allowing for downstream, i.e., lateral sequential, activities to commence quicker and with more regularity in the plan.

Figure 8:
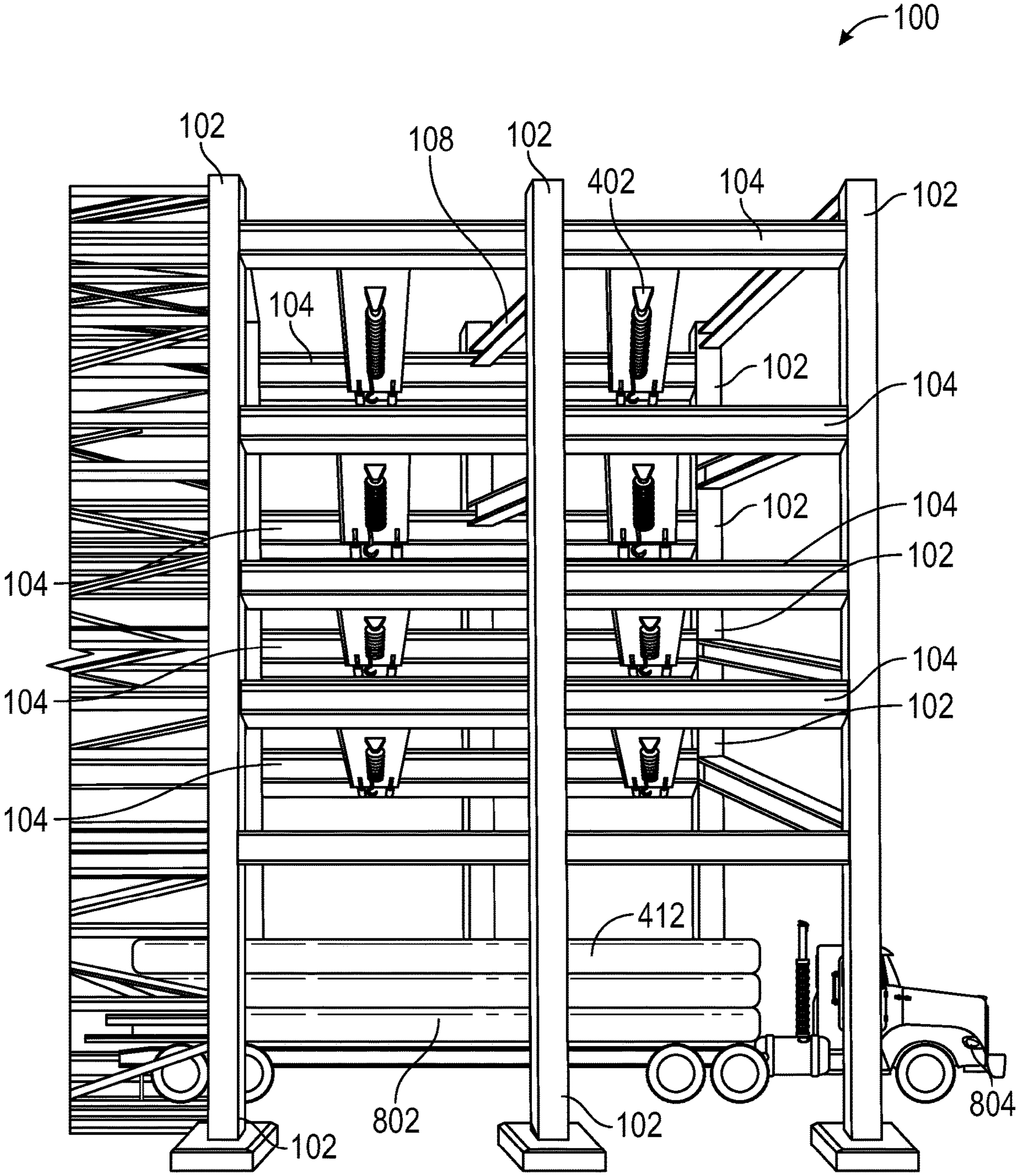
FIG. 8 is an isometric view illustrating the system of the present disclosure in connection with a pipe load.

Referring to FIG. 8, an isometric view of the system of the present disclosure in connection with a pipe load 802, as the system component 412, is illustrated. A truck 804 is positioned within the structural system 100, preferably below a loading bay 406, where bridge cranes 402, as the removable repositioning device 400, can be coupled to the pipe load 802 and move each system component 412 to the appropriate level upward and then transmit laterally within the structural system 100 to position system component at the appropriate location.

Referring to FIGS. 1-8, for construction of a structural system for construction and maintenance of a facility, a plurality of support beams 102 is provided, at least some of which are vertical and some of which may be diagonal. A first longitudinal beam 104*a* having a first longitudinal beam lower rectangular flange 106*a* is attached horizontally to two of the plurality of support beams 102. A second longitudinal beam 104*b* having a second longitudinal beam lower rectangular flange 106*b* is attached horizontally to a further two of the plurality of support beams 102, where, the first longitudinal beam 104*a* is parallel to and vertically aligned with the second longitudinal beam 104*b*, and wherein a planar space between the first longitudinal beam 104*a* and the second longitudinal beam 104*b* is free of any obstructions. This lack of obstructions avoids objects which would interfere with operation, particularly where system components 412 may be stored or affixed to the structural system 100. A cross beam 108 is attached to a first support beam 102*a* above the longitudinal beam lower rectangular flange 106 of the first longitudinal beam 104*a*, wherein the first longitudinal beam lower rectangular flange 106*a* is adapted to provide a track for engagement by a removable repositioning device 400 which has a first plurality 504 of upper wheels 502 adapted to contact the first longitudinal beam lower rectangular flange 106*a*. The cross beam 108 is attached to a second support beam 102*b* above the second longitudinal beam lower rectangular flange 106*b* of the second longitudinal beam 104*b*, where the second longitudinal beam lower rectangular flange 106*b* is adapted to provide a track for engagement by a removable repositioning device 400 which has a second plurality 508 of upper wheels 502 adapted to contact the second longitudinal beam lower rectangular flange 106*b*. The removable repositioning device 400, which may be a trolley 402 and a bridge crane 404, is removably attached to the first longitudinal beam lower rectangular flange 106 of the first longitudinal beam

104*a* and to the second longitudinal beam lower rectangular flange 106, the removable repositioning device 400 adapted to reposition a system component 412. When no longer needed, the removable repositioning device 400 is detached from the longitudinal beam lower rectangular flange 106 of the first longitudinal beam 104*a* and from the longitudinal beam lower rectangular flange 106 of the second longitudinal beam 104*b*.

When desired, multiple stories may be provided. A third longitudinal beam 104*c* having a third longitudinal beam lower rectangular flange 106*c* is attached horizontally to two of the plurality of support beams 102 below the first longitudinal beam 104*a*. A fourth longitudinal beam 104*d* having a fourth longitudinal beam lower rectangular flange 106*d* is attached horizontally to a further two of the support beams 102, the third longitudinal beam 104*c* parallel and vertically aligned with the fourth longitudinal beam 104*d*. A second cross beam 108*b* is attached to the first support beam 102*a* above the third longitudinal beam lower rectangular flange 106*c* and to the second support beam 102*b* above the fourth longitudinal beam lower rectangular flange 106*d*. A second removable repositioning device 400, which may be a trolley 402 or a bridge crane 404, is removably attached to the third longitudinal beam lower rectangular flange 106*c* and to the fourth longitudinal beam lower rectangular flange 106, where the second removable repositioning device 400 is adapted to reposition a system component 412. When no longer needed, the second removable repositioning device 400 is detached from the third longitudinal beam lower rectangular flange 106 and from the fourth longitudinal beam lower rectangular flange 106.

When desired, a removable work platform 408 may be used. The removable work platform 408 is removably attached to the first longitudinal beam lower rectangular flange 106*a* and to the second longitudinal beam lower rectangular flange 106*b*. When no longer needed, the removable work platform 408 is detached from the first longitudinal beam lower rectangular flange 106 and from the second longitudinal beam lower rectangular flange 106.

Finally, when desired, a removable bus bar 410 may be positioned adjacent the first longitudinal beam lower rectangular flange 106, until no longer needed, at which time it the removable bus bar 410 may be removed.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for construction of a structural system, comprising:

providing a plurality of support beams;

attaching a first longitudinal beam having a first longitudinal beam lower rectangular flange horizontally to two of the plurality of support beams;

attaching a second longitudinal beam having a second longitudinal beam lower rectangular flange horizontally to a further two of the plurality of support beams, the first longitudinal beam parallel and vertically aligned with the second longitudinal beam, wherein a planar space between the first longitudinal beam and the second longitudinal beam is free of any obstructions;

attaching a cross beam at a cross beam first end to a first support beam of the plurality of support beams above the longitudinal beam lower rectangular flange of the first longitudinal beam, the first longitudinal beam lower rectangular flange adapted to provide a track for engagement by a removable repositioning device;

attaching the cross beam at a cross beam second end to a second support beam of the plurality of support beams above the second longitudinal beam lower rectangular flange of the second longitudinal beam, the second longitudinal beam lower rectangular flange adapted to provide a track for engagement by a removable repositioning device; and coupling a cross beam first end flange at the cross beam first end to the first support beam and the first longitudinal beam with a connector, the connector comprising:

a first L-shaped bracket adapted to contact the cross beam first end flange and a top surface of a first longitudinal beam top rectangular flange; and a second L-shaped bracket adapted to contact the first support beam and the cross beam lower flange at the cross beam lower edge.

2. The method of claim 1, further comprising:

attaching a third longitudinal beam having a third longitudinal beam lower rectangular flange horizontally to two of the plurality of support beams below the first longitudinal beam;

attaching a fourth longitudinal beam having a fourth longitudinal beam lower rectangular flange horizontally to a further two of the support beams, the third longitudinal beam parallel and vertically aligned with the fourth longitudinal beam;

attaching a second cross beam to the first support beam above the third longitudinal beam lower rectangular flange; and attaching the second cross beam to the second support beam above the fourth longitudinal beam lower rectangular flange.

3. The method of claim 1, further comprising removably attaching a removable work platform to the first longitudinal beam lower rectangular flange and to the second longitudinal beam lower rectangular flange.

* * * * *